United States Patent [19]
Hyde et al.

[11] Patent Number: 5,866,018
[45] Date of Patent: Feb. 2, 1999

[54] VORTEX AQUARIUM FILTER

[75] Inventors: Robert H. Hyde, Riverview; Joseph E. Gargas, Apollo Beach; Eric W. Curtis, Tampa, all of Fla.

[73] Assignee: The Hartz Mountain Corporation, Secaucus, N.J.

[21] Appl. No.: 933,117

[22] Filed: Sep. 18, 1997

[51] Int. Cl.$^6$ .................................................. A01K 63/04
[52] U.S. Cl. ........................ 210/787; 210/788; 210/169; 210/416.2; 210/512.1; 119/259; 119/260
[58] Field of Search .................................. 210/787, 788, 210/169, 416.2, 512.1; 119/259, 260

[56] References Cited

U.S. PATENT DOCUMENTS

| | | |
|---|---|---|
| 1,995,651 | 3/1935 | Rathbun . |
| 3,669,883 | 6/1972 | Huckstedt ............................. 210/169 |
| 3,719,278 | 3/1973 | Kolferz ................................. 210/169 |
| 3,772,192 | 11/1973 | Huckstedt et al. . |
| 4,834,872 | 5/1989 | Overath ................................ 210/151 |
| 5,078,867 | 1/1992 | Danner ................................. 210/169 |
| 5,451,318 | 9/1995 | Moorehead .......................... 210/512.1 |
| 5,470,465 | 11/1995 | Moorehead et al. ................. 210/512.1 |
| 5,484,525 | 1/1996 | Mowka, Jr. .......................... 210/169 |

Primary Examiner—Robert J. Popovics
Attorney, Agent, or Firm—Stroock & Stroock & Lavan LLP

[57] ABSTRACT

An aquarium filter is provided having a first annular chamber and an inlet or near the top of the chamber. The inlet is constructed and positioned to direct water into the chamber in a swirling direction, concentric with the annular wall. The first chamber also includes a first water outlet at the top of the chamber for filtered water to exit the chamber. The first chamber also includes a waste outlet at the bottom of the chamber. As water enters the first chamber from the inlet, it swirls in the chamber, creating a vortex. Particles within the water are forced against the annular wall, slide down the wall and migrate towards the waste outlet at the bottom of the chamber. A collector, such as a simple collection pot can be coupled to the waste outlet and particles separated from the water will collect in the pot. A selectively closeable cleaning outlet at or near the bottom of the collection pot can be used to empty the material collected there.

19 Claims, 3 Drawing Sheets

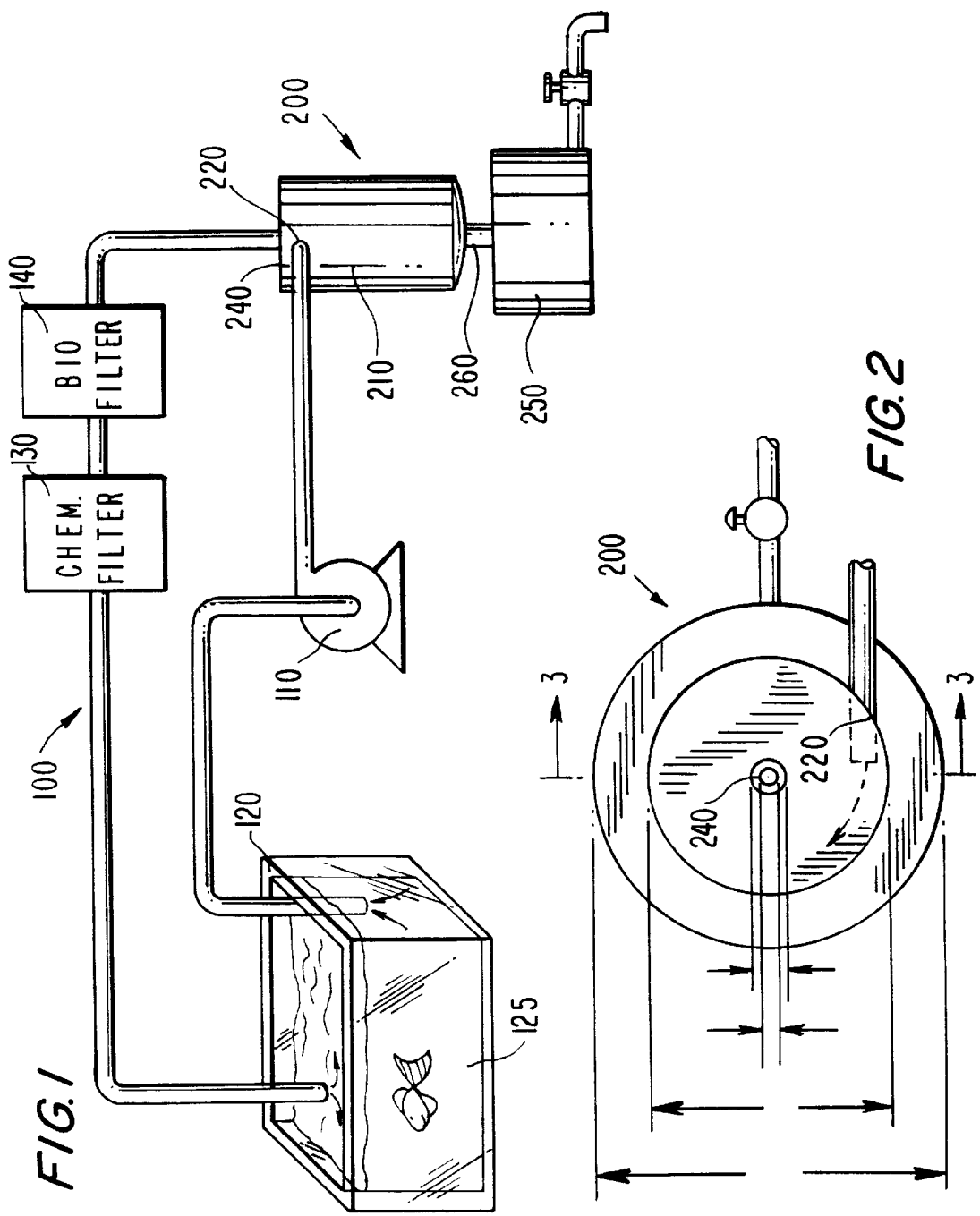

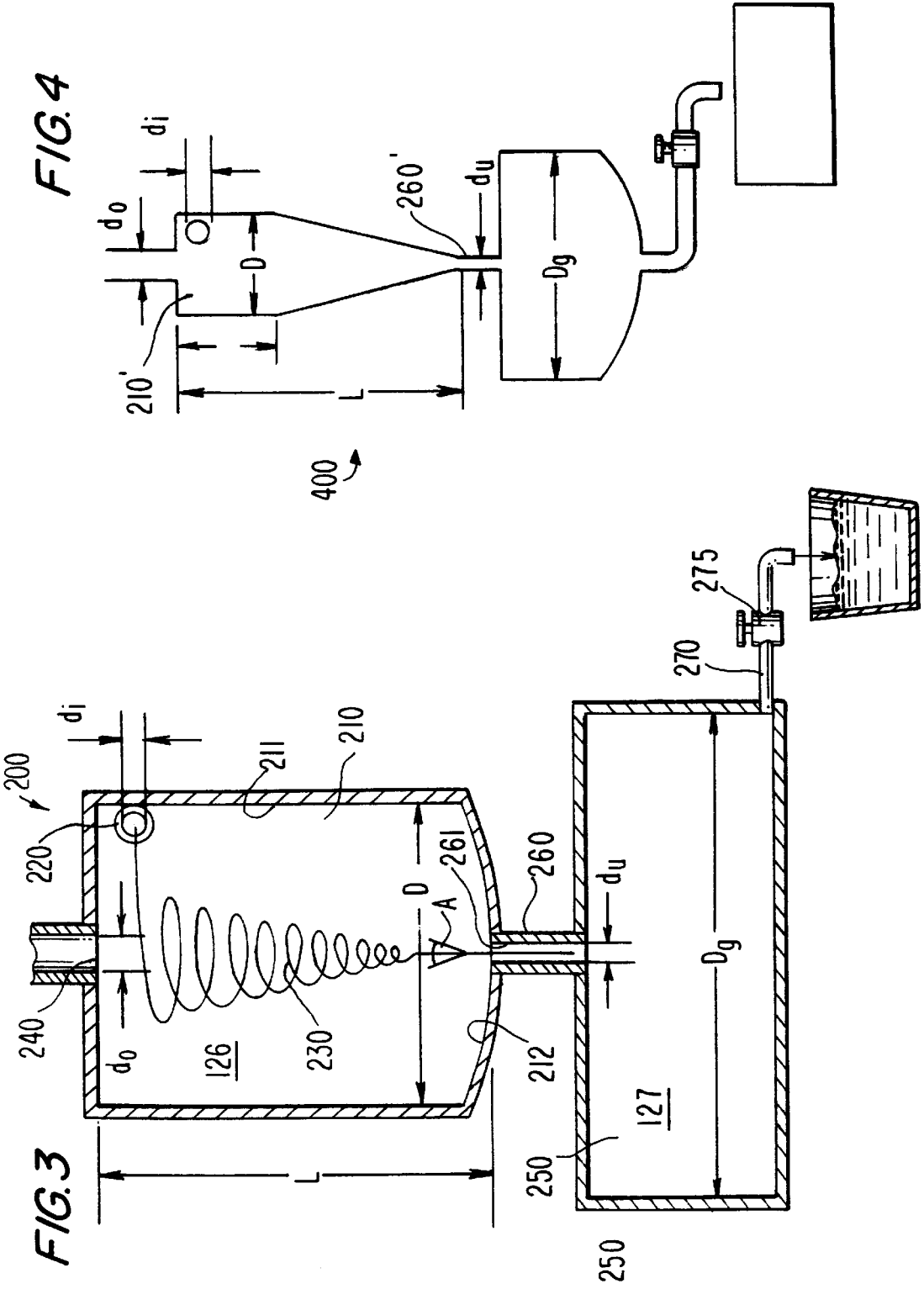

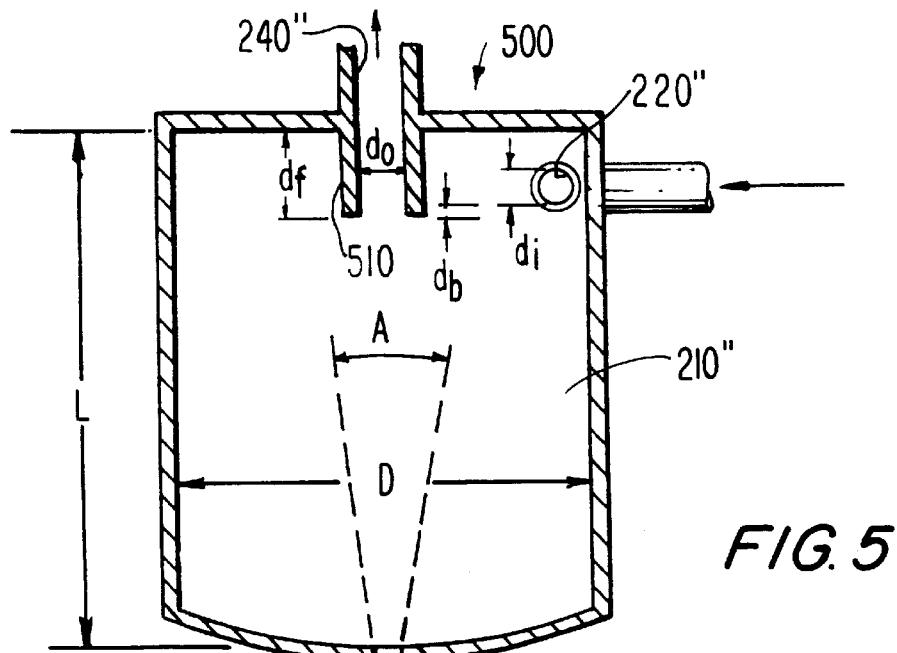
FIG. 5
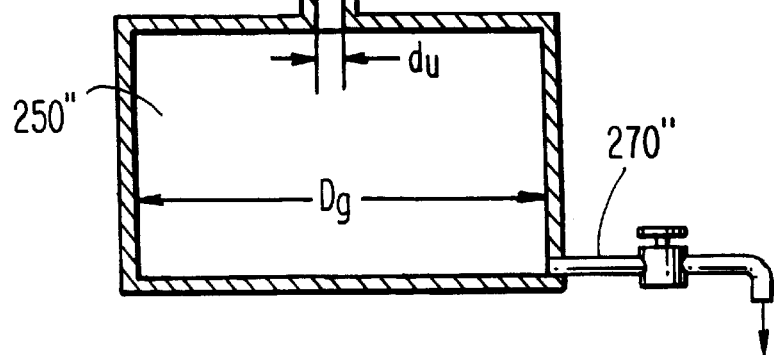
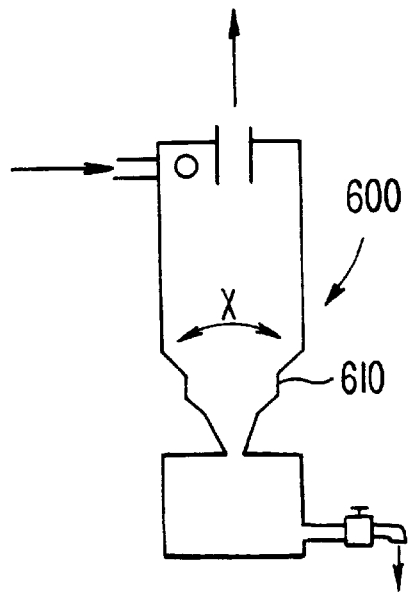
FIG. 6

VORTEX AQUARIUM FILTER

BACKGROUND OF THE INVENTION

The invention is directed generally to filters for aquariums and more particularly to a filter for removing particles from aquarium water.

Conventional aquariums employ a combination of mechanical, chemical and/or sometimes biological filtration in order to remove various undesirable materials from aquarium water. Many conventional filters for hobbyist size aquariums include a fabric pad, wad of floss or some other fabric-type material for trapping solid particles. Other conventional filters draw particles into the gravel bottom of the aquarium.

Aquarium water contains many undissolved particles. Some are very small, with a diameter of a few microns or less. These may consist of bacteria and bits of organic and inorganic molecules clumped together. Conventional mechanical filters catch and holds particles by physically trapping the particles within the filtering material. Consequently, most mechanical filters can only capture particles larger than 50 to 100 microns. Diatomacous earth filters can remove small particles in the range of a few microns in size. However, a filter which can capture the smallest particles will clog quickly and water flow therethrough and its effectiveness will quickly diminish. Therefore diatome type filters are only used sporadically. Also, filters that capture the smallest particles can clog quickly and need to be cleaned more frequently in order to maintain functional water flows.

A conventional method for eliminating these particles is to use a diatome-type filter. In operation, diatome powder is coated on the surface of a filter bag cartridge-type filter. The diatome powder includes minute pores and particles within the aquarium water become trapped in the pores. Often, the bottom of an aquarium is stirred up to permit the particles that settled onto the gravel to be drawn into the diatome filter and trapped in the combination of filter bag and diatome powder. The powder can be messy to use and cleaning the filter bag can be a messy unpleasant task. Accordingly, such filters are not fully satisfactory.

Large particles will tend to settle at the bottom of aquariums, especially where there is minimal turbulence and water circulation. Most tropical fish require this minimal turbulence and accordingly, a flow rate high enough to remove such particles cannot be maintained for more than a short amount of time. Frequently, detritus from various sources will accumulate on the bottom of an aquarium, giving the gravel a dirty appearance. Particles can also affect the turbidity of the aquarium water. Accordingly, an improved filter which can remove these heavy particles after the bottom is stirred up as well as minute particles is desirable.

Commercial settings, such as pet shops, connect multiple tanks to a central filtration system. This filtration system typically includes a cartridge-type filter with a large filtering core. As the filter core becomes clogged with debris, the flow rate through the filter decreases and the performance of the overall filtration system can be adversely affected. Such filters are inconvenient and unpleasant to clean and can require some type of back washing with reverse flow through the filtration material—an inconvenient task. Also, such filters may not be able to trap the smallest particles.

Accordingly, it is desirable to provide an improved filter for both hobbyist and commercial aquariums, which avoids the drawbacks of the prior art.

SUMMARY OF THE INVENTION

Generally speaking, in accordance with the invention, an aquarium filter is provided having a first annular chamber and an inlet at or near the top of the chamber. The inlet is constructed and positioned to direct water into the chamber in a swirling direction, concentric with the annular wall. The first chamber also includes a first water outlet at the top of the chamber for filtered water to exit the chamber. The first chamber also includes a waste outlet at the bottom of the chamber. As water enters the first chamber from the inlet, it swirls in the chamber, creating a vortex.

Particles within the water are forced against the annular wall, slide down the wall and migrate towards the waste outlet at the bottom of the chamber. A collector, such as a simple collection pot can be coupled to the waste outlet and particles separated from the water will collect in the pot. The diameter of the collection pot is can be larger than that of the first chamber and the collection pot and first chamber are preferably coupled by a tube that is significantly smaller in diameter than the diameter of the first chamber. A selectively closeable cleaning outlet at or near the bottom of the collection pot can be used to empty the material collected there.

Accordingly, it is an object of the invention to provide an improved filter for removing particles and turbidity from aquarium water.

Another object of the invention is to provide an aquarium filter in which filter bags, pads and the like do not have to be replaced or cleaned.

Still another object of the invention is to provide an aquarium filter having a simple construction and minimal moving parts.

Still other objects and advantages of the invention will in part be obvious and will in part be apparent from the specifications and drawings.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a filler understanding of the invention, reference is had to the following description taken in connection with the accompanying drawings, in which:

FIG. 1 is a perspective view of an aquarium filtration system constructed in accordance with a preferred embodiment of the invention;

FIG. 2 is a top view of a mechanical filter constructed in accordance with a preferred embodiment of the invention;

FIG. 3 is a cross sectional view of the filter of FIG. 2;

FIG. 4 is a side view of a mechanical filter constructed in accordance with another preferred embodiment of the invention;

FIG. 5 is a cross sectional view of a mechanical filter constructed in accordance with another preferred embodiment of the invention; and FIG. 6 is a cross sectional view of a filter constructed in accordance with another preferred embodiment of the invention having a stepped bottom surface.

DETAILED DESCRIPTION OF THE PREFERRED EMBODIMENTS

A system for filtering the water from one or more aquariums is shown generally as a filter system 100 in FIG. 1.

System 100 includes a pump 110 for removing water 125 from an aquarium 120, a mechanical filter 200, an optional chemical filter 130 and an optional biological filter 140. These can be connected series with mechanical filter 200 as shown or separately. For example, water can be removed from one or more aquariums to a sump. Water is then removed from the sump, filtered by one or more of the filtration apparatuses and then sent back to the sump. Water from the sump is returned to the one or more aquariums. This invention is primarily directed to an improved apparatus for providing mechanical filtration to filtration system 100.

Mechanical filtration of a quantity of aquarium water 125 is effected in accordance with an embodiment of the invention with a vortex mechanical filter 200, shown in FIGS. 1–3. A vortex mechanical filter 400 shown in FIG. 4 and other embodiments thereof can be substituted. In operation, aquarium water 125 containing particles is pumped to an inlet 220 at an upper chamber 210 of filter 200. Inlet 220 has an inner diameter $d_i$. Upper chamber 210 preferably has an annular side wall 211. Inlet 220 is constructed and positioned to direct water 125 in a direction substantially tangential to side wall 211 of upper chamber 220. In this manner, the water flowing into upper chamber 220 will swirl therein. As the velocity of water entering upper chamber 210 is increased, a vortex 230 will begin to form towards the center thereof. As the velocity of rotating water 126 within upper chamber 210 increases, the vortex will become tighter and tighter, i.e., the angle of the apex A (FIG. 3) of the vortex core decreases, until the vortex characteristics degenerate.

Upper chamber 210 includes an overflow outlet 240 of inner diameter $d_o$. The volume of water entering upper chamber 210 through inlet 220 is substantially equal to that leaving outlet 240. However, such water has been rotated around the interior of upper chamber 210 and thereby had particles removed therefrom.

Upper chamber 210 includes a bottom wall 212. Bottom wall 212 preferably slopes downwards to encourage particles removed from water 126 to accumulate at the center of wall 212. Bottom wall 212 should be formed with an underflow opening 261, preferably at the center thereof, so that particles filtered from aquarium water 126 can be segregated from chamber 210 and collected elsewhere. Upper chamber 210 can be in fluid communication with a collection pot 250 coupled to chamber 210 by a short tube 260 of inner diameter $d_u$ located preferably at the center of bottom wall 212.

It is preferable that water 127 within collection pot 250 remain relatively placid and that there be relatively little, if any, flow of contaminates from collection pot 250, back up tube 260 into upper chamber 210. In one embodiment of the invention, collection pot 250 has an inner diameter $D_g$, which is larger than the inner diameter D of upper chamber 210. In a second embodiment of the invention, $D_g = D$ and in a third embodiment, $D_g < D$. The inner diameter $d_u$ of waste collection tube 260 should be small compared to inner diameter D of upper chamber 210 and the diameter $D_g$ of pot 250. Preferably, the ratio of $d_u$ to D is less than 0.3, preferably less than 0.25 and most preferably about 0.2.

In operation, unfiltered water 125 from aquarium 120 enters upper chamber 210 tangentially, causing the rotation of such water, to produce centrifugal force. This force pushes material with a density greater than the water towards inside surface 211 of upper chamber 210. The rotating flow pattern within the chamber 210 continues to push this "filtered" material toward the underflow outlet 261 having diameter $d_u$. Whereas some particles are so light that it can take days for them to settle in a standing jar, these same particles will quickly migrate to underflow outlet 261 and into collection pot 250. The clarified water is forced toward the central core of vortex 230 and exits through overflow outlet 240 which has inner diameter $d_o$. The concentrated particulates which were forced toward the apex of vortex 230 exit chamber 210 through underflow outlet 261 and collect in collection pot 250.

Collection pot 250 is provided with a drain 270 substantially at the bottom thereof. Drain 270 include a selectively opening valve 275 which is normally kept in the closed position. To discharge waste collected in collection pot 250, valve 275 is opened and water 127 together with any waste in collection pot 250 is flushed out drain 270 to a drain, a bucket or is otherwise disposed of.

Mechanical filters in accordance with the invention use centrifugal action to separate particulate material from water. The filter body includes a cylindrical body which can taper down to a cone shape. The filter can include a tangential inlet ($d_i$), a central overflow outlet ($d_o$), an underflow outlet ($d_u$) and a grit pot for collecting separated waste.

The water/particulate solution enters ($d_i$) tangentially at the cylinidrical section of the body causing the rotation of the solution to produce the centrifugal force. This force pushes material with a density greater than the medium (water) toward the outer perimeter of the body and a flow pattern combines to push the denser material toward the underflow outlet ($d_u$). The clarified water is forced toward the central core and exits through the overflow outlet ($d_o$). The concentrated particulates which were forced toward the apex of the cone exit the body through the underflow outlet ($d_u$) and collect in the grit pot to be later manually discharged to a waste drain.

The inlet velocity can be used as a starting point for calculating the physical characteristics of the upper chamber, inlets and outlets. The lower the total pressure drop across the inside of the filter, the higher the efficiency in separating particules.

In order for vortex filter 200 to work optimally, the diameters of the various parts must be in proper relation to achieve an optimal flow pattern within upper chamber 210. Optimal vortex flow maintains consistent circular motion while minimizing turbulence in upper chamber 210. For example, the ratio of $d_i$: D should be not more than about 0.35, preferably less than about 0.3. The inlet opening can be rectangular, having the same cross-sectional area as required for the circular opening. A rectangular shape cross section is preferred, as it leads to less turbulence. If the diameter of $d_i$ of the inlet 220 is too large, of water exiting inlet 220 will be too low and a suitable vortex will not form therein. ($d_u$). An extension tube can be included below the top of upper chamber 210 to reach cleaner, less turbulent water than can be present at the top of chamber 210.

The ratio of the inside diameter $d_o$ of outlet 240 to diameter D should be not more than about 0.5, preferably less than about 0.4 and most preferably less than about 0.3. If diameter $d_o$ of outlet 240 is too great, the pressure within chamber 210 will be too low, water will exit chamber 210 too readily and a good vortex will not be formed. In the event the diameter of outlet 240 is too small, there will be insufficient flow through the chamber and again, a proper vortex will not form.

The ratio of the inner diameter $d_u$ of underflow outlet 261 (and tube 260) to diameter D should be not more than about 0.3, preferably less than about 0.25 and most preferably less than about 0.20. If diameter $d_u$ is too great, rotational movement will be imparted to water 127 within collection pot 250. This will prevent the removed particles from settling properly and could permit waste to migrate up through underflow tube 260, back into chamber 210.

The ratio of the inner height (L) of chamber 210 to inner diameter D should be about 4 to 1 to about 6 to 1, most preferably about 5 to 1. If the ratio of height to width is too great, the vortex will not reach sufficiently far down the chamber to collect wastes at the center thereof and temporary removed particle will be carried off well 211 and out through outlet 240. If the height to width ratio is too small, it will be difficult to form a proper vortex and rather, the rotation of water at the top of chamber 210 will be in a similar pattern to that towards the bottom thereof. If the height is too great, particles pressed against the side will never reach the bottom, but instead will be pulled back into the circulating water and be blown off the top.

A vortex filter constructed in accordance with another embodiment of the invention is shown generally as vortex filter 500 in FIG. 5. Filter 500 is similar in construction to filter 200, and includes an upper chamber 210'', an inlet 220'', an outlet 240'' and a collection pot 250'', similar in construction to items 210, 220 240 and 250 of filter 200. One difference from filter 200 is that $D_g$ of the waste collection pot is about equal to D. Another is that filter 500 includes a vortex finder 510, in the form of a tube extending down from outlet 240'' to a position below inlet 220''. The water swirling in upper chamber 210'' tends to have some turbulence at or above inlet 220''. Therefore, by collecting water for outlet 240'' a distance $d_b$ below inlet 220'', the water will have less debris than the more turbulent water above the bottom end of vortex finder 510. Preferred lengths $d_f$ for vortex finder 510 are $d_f=(0.3-0.5)/D$, preferably about 0.4/D.

It is particularly advantageous to reduce back pressure out of outlet 240. One way to reduce back pressure is to limit the height the water travels to go from outlet 240 to a sump or aquarium. Thus, water preferably travels less than 12 inches and more preferably, less than 8 inches above the top of chamber 210, before it pours into a tank, such as a sump or aquarium tank.

It is also advantageous to reduce back pressure by coupling an overflow tube of increased diameter to the outlet, for example, at least a 20% or even a 50% or larger increase over the diameter of the outlet.

An alternate embodiment of a vortex filter constructed in accordance with the preferred embodiment of the invention is shown generally as vortex filter 400 in FIG. 4. Vortex filter 400 includes a cone shaped bottom portion 401, which enhances the ability of an upper chamber 210' to produce a proper vortex. It also enhances the collection of particles at an underflow tube 260'. Filter 400 can be found with a relatively long tapered cone, with respect to the height of upper chamber 210', the cone having an angle of 10° to 60°, preferably 15° to 25°, most preferably 20°. It can also have a bottom portion 401 shorter in height than the height of upper chamber 210'. The walls defining bottom portion 401 can be straight or stepped, and the number of steps is not limited. A filter 600 having a stepped surface 610 of an angle X is shown in FIG. 6. The angle of bottom portion 401 can also be any value from 60° to 180°.

A vortex filter, constructed in accordance with preferred embodiments of the invention can be used in the following manner. A hobbyist who seeks to remove detritus settled in the gravel of an aquarium can connect a vortex filter to the aquarium temporarily, stir up the bottom to cause particles to become temporarily suspended and then run the vortex filter for a short amount of time to remove particles from the aquarium. Connecting the vortex filter will also remove fine particles which fall through many conventional filters.

In another embodiment of the invention, one or more aquariums are coupled to a sump or collection tank and water is drawn from the aquariums into the sump. This water is filtered with the vortex filter and then returned to the sump. Water from the sump is pumped back to the tanks or to supplemental filtration units. Thus, dirty water from the tanks is constantly diluted with clean filtered water. The water from the sump can also be subjected to biological and chemical filtration. It is preferable to subject the water to mechanical filtration, followed by biological filtration and finally chemical filtration, as the material removed by mechanical filtration would have tied up the biological and chemical filters, and the material removed by the biological filter could reduce the capacity of the chemical filter, but this does not work the same in reverse.

Aspects of the invention will be set forth more clearly with reference to the following examples. These examples are presented for purposes of illustration only and are not intended to be construed in a limiting sense.

EXAMPLE 1

A particularly effective example of a vortex filter constructed in accordance with an embodiment of the invention has a first chamber which is 19.75 inch tall and a 6.5 inches high collection pot. The first chamber has a half inch opening at its top side for water to enter and a one inch diameter outlet at its top center thereof. This outlet is bushed to 1.5 inch pipe and is not raised more than 8 inches (7¾ inches) before it is fed to a sump tank. Both the first chamber and collection pot are formed from four inch diameter PVC tubes. This filter was run at a flow rate of 75 GPM with a ½ HP size pump.

EXAMPLE 2

The example of a filter similar to 400, with a stepped cone structure, similar to that of filter 600 of FIG. 6, was constructed with the following dimensions:

D=6 inches
$d_i$=1 inch (adjustable)
$d_o$=1.5 inches
$d_u$=1 inch

The cylindrical body had a length of 22 inches, the bottom cone was 9.25 inches long and the grit pot was 9 inches high, by 6 inches diameter. At a variable flow rate of 30–60 GPM and an inlet pressure of 15 psi, an aquarium system with a bioload of about 300 2–2.5 inch tropical fish fed 50 g of 45% protein flakes daily in 600 gallons of water was kept suitably free of debris with a system using the above filter for mechanical filtration.

EXAMPLE 3

A 400 gallon system filled with about 2300 tropical fish, 1.5 to 2.5 inches long and fed 15 g of 45% protein flakes daily was kept suitably free of debris using the following filter for mechanical filtration:

Style: Filter 600
D=4 inches
$d_o$=1 inches
$d_u$=0.5 inch $d_i$=0.5 inch (adjustable)
cylindrical body length=16 inches
cone length=4 inches
collection pot=4 inches×4 inches
inlet pressure=15 psi
variable flow rate=15–30 GPM

EXAMPLE 4

The following example of filter 600 was found to be suitable.
D=2 inches
$d_i$=0.5 inch adjustable
$d_o$=1 inch
$d_u$=0.5 inch
cylindrical body length=8 inches
cone length=2 inches
collection pot=4×4 inches
inlet pressure=15 psi
variable flow rate=10–20 GPM

EXAMPLE 5

The following example of filter type 500 was found to be suitable.
D=11 inches
$d_i$=0.5 inches
$d_o$=2 inches
$d_u$=0.5 inch
cylindrical body length=13 inches
collection pot=10 inches high by 6 inches diameter
inlet presure=15 psi
variable flow rate=10–25 GPM

EXAMPLE 6

The filter of examples 2–5 were operated at an inlet pressure of 15 psi. This can be varied by adjusting the inlet diameter ($d_i$). The filters were observed to remove particles as small as 20 $\mu$, consisting of mulm, fish waste, algae, plant fibers, sand and micro organisms.

By comparison, a conventional pleated fiber cartridge type filter with a 20 $\mu$ nominal rating will retain about 100% of particles that are 20 $\mu$ and larger with a single pass. However, as more and more particles are trapped in the filter, flow through the filter becomes constrained. Also, fresh water comes in contact with the removed waste and a bio-film can grow.

In contrast, when using filters in accordance with the invention as set forth above, although less than 100% of the smallest particles are removed with each pass, there is no reduction of flow, less of a bio-film problem and maintenance is considerably easier.

EXAMPLE 7

The following relations were found to be acceptable.
$d_o/D$=0.28
$d_i/D$=0.20
$d_u/D$=0.20
$1/D$=0.4
$L/D$=5

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed, is:

1. An aquarium system including a filter which can remove particles from aquarium water without the need for physical entrapment elements, comprising:
    an aquarium containing water;
    a first chamber having an interior defined by an annular wall, a top surface and a bottom surface the first chamber having a top and a bottom and being constructed to permit water to swirl therein and form a vortex;
    an inlet located near the top of the first chamber, the inlet in fluid communication with the aquarium, the inlet sized and positioned to direct water into the first chamber in a swirling direction, whereby a vortex of water can be formed within the first chamber;
    a first overflow outlet located near the top of the first chamber and in fluid communication with the aquarium, the overflow outlet dimensioned and positioned to substantially permit water which has swirled within the interior of the first chamber to exit therefrom, the overflow outlet coupled to an overflow tube, the tube sized, arranged and positioned to provide low back pressure to the overflow outlet; and
    a waste outlet in the bottom surface of the first chamber, the waste outlet having a first open end in fluid communication with the interior of the first chamber, the open end constructed and arranged to permit waste particles to be forced therethrough by water swirling within the first chamber, the waste outlet having a second selectively openable end, constructed and arranged to permit waste forced to the waste outlet to be flushed out of the outlet by the pressure exerted by water within the first chamber whereby the filter can remove particles from the aquarium water without the need for a mechanical entrapment device.

2. The aquarium system of claim 1, wherein the waste outlet includes a second chamber in fluid communication with the first chamber and the second chamber has an outlet towards the bottom thereof, the outlet being selectively closeable.

3. The aquarium system of claim 2, wherein the second chamber has a diameter equal to the diameter of the first chamber.

4. The aquarium system of claim 3, wherein the second chamber is coupled to the first chamber by a tube located at substantially the center bottom of the first chamber, the tube having a diameter substantially smaller than that of the first chamber and the second chamber.

5. The aquarium system of claim 2, wherein the ratio of height of the first chamber to height of the second chamber is from about 4:1 to 6:1.

6. The aquarium system of claim 1, wherein the overflow tube raises water from the outlet no more than about 12 inches before the water is discharged therefrom.

7. The aquarium system of claim 1, wherein the overflow tube raises water from the outlet no more than about 8 inches before the water is discharged therefrom.

8. The aquarium system of claim 1, wherein the ratio of the diameter of the inlet to the diameter of the first chamber is not more than about 0.35.

9. The aquarium system of claim 1 wherein, the ratio of the diameter of the outlet to the diameter of the first chamber is not more than about 0.5.

10. The aquarium system of claim 1 wherein, the ratio of the diameter of the underflow outlet to the diameter of the first chamber is not more than about 0.3.

11. The system of claim 1, wherein the overflow tube raises water from the outlet no more than about 12 inches before the water is discharged therefrom.

12. The system of claim 1, wherein the overflow tube raises water from the outlet no more than about 8 inches before the water is discharged therefrom.

13. The system of claim 1, wherein the overflow tube includes at least a first section of increased diameter compared to the diameter of the overflow outlet.

14. The filter of claim 1, including a tube extending from the first outlet to a location within the first chamber below the level of the inlet.

15. The filter of claim 1, wherein the tube extends a length l down from the top of the first chamber, the first chamber has a diameter D and l/D is about 0.3 to 0.5.

16. The aquarium system of claim 1, wherein the bottom surface is cone shaped, and defines an angle from the waste outlet, upwards, of about 10° to 60°.

17. The aquarium system of claim 1, wherein the bottom surface has a stepped cone shape.

18. A method of filtering particles from aquarium water, comprising:

directing water from an aquarium into a chamber of a filter housing having a side wall, a top surface and a bottom surface and an overflow outlet adjacent to the top surface of the chamber and an outlet located in the bottom surface of the chamber;

swirling the directed water within the chamber at a velocity sufficient to direct particles within the water to the side wall, then to the outlet in the bottom surface and then to a collection vessel located beneath the chamber; and returning water which has swirled within the chamber to the aquarium under conditions of low back pressure.

19. The method of claim 18, wherein the overflow tube includes at least a first section of increased diameter compared to the diameter of the overflow outlet.

* * * * *